United States Patent
Kenyon et al.

(10) Patent No.: US 9,903,214 B2
(45) Date of Patent: Feb. 27, 2018

(54) INTERNALLY COOLED TURBINE BLISK AND METHOD OF MANUFACTURE

(71) Applicant: General Electric Company, Schenectady, NY (US)

(72) Inventors: Ross Hartley Kenyon, McMinnville, TN (US); Narendra Digamber Joshi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 351 days.

(21) Appl. No.: 14/721,681

(22) Filed: May 26, 2015

(65) Prior Publication Data
US 2016/0348517 A1   Dec. 1, 2016

(51) Int. Cl.
*F01D 5/34* (2006.01)
*F01D 5/18* (2006.01)
(Continued)

(52) U.S. Cl.
CPC .............. *F01D 5/34* (2013.01); *B22F 3/1055* (2013.01); *B23K 26/342* (2015.10); *F01D 5/18* (2013.01);
(Continued)

(58) Field of Classification Search
CPC .. B22F 5/04; B22F 7/06; F04D 29/321; F04D 29/324; F04D 29/388; F04D 29/584;
(Continued)

(56) References Cited

U.S. PATENT DOCUMENTS

| 6,094,905 A * | 8/2000 | Fukuyama | ............... F01D 5/06 415/115 |
| 6,682,688 B1 * | 1/2004 | Higashi | ............... B22F 3/1055 156/272.8 |

(Continued)

OTHER PUBLICATIONS

Magerramova, Liubov. "Achievement of Bimetallic Blisks Integrated Dissimilar Alloys for Promising High Temperature Aviation Gas Turbine Engines." 28th Congress of the International Council of the Aeronautical Sciences, pp. 1-9, Sep. 23-28, 2012, Brisbane, Australia, Paper ICAS 2012-4.1.3.

*Primary Examiner* — Woody Lee, Jr.
*Assistant Examiner* — Brian O Peters
(74) *Attorney, Agent, or Firm* — Nitin N. Joshi

(57) ABSTRACT

A method of manufacturing an internally cooled blisk by additive manufacturing processes to provide weight reduction and power-to-weight ratio improvement, leading to improved efficiency, a decrease in fuel burn and lifecycle costs in an engine employing the internally cooled blisk. The method of manufacturing including defining a configuration for the internally cooled blisk, the configuration comprising a disk, an annular array of angularly spaced blades extending about a periphery of the disk and one or more internal cooling features defined within the internally cooled blisk. The method further including the step of programming the configuration into an additive manufacturing system. A powder is deposited into a chamber and an energy source is applied to the deposited powder to consolidate the powder into a cross-sectional shape corresponding to the defined configuration. Additionally provided is an internally cooled blisk.

17 Claims, 5 Drawing Sheets

(51) Int. Cl.
*F04D 29/58* (2006.01)
*B23K 26/34* (2014.01)
*B22F 3/105* (2006.01)
*F04D 29/32* (2006.01)
*B23K 26/342* (2014.01)
*F04D 29/02* (2006.01)
*B23K 103/18* (2006.01)

(52) U.S. Cl.
CPC ......... *F04D 29/023* (2013.01); *F04D 29/321* (2013.01); *F04D 29/324* (2013.01); *F04D 29/584* (2013.01); *B22F 2301/15* (2013.01); *B23K 2203/26* (2015.10); *F05D 2220/323* (2013.01); *F05D 2230/22* (2013.01); *F05D 2230/31* (2013.01); *F05D 2240/30* (2013.01); *F05D 2260/20* (2013.01); *F05D 2300/175* (2013.01); *F05D 2300/20* (2013.01); *F05D 2300/603* (2013.01)

(58) Field of Classification Search
CPC ... F05D 2230/31; B23K 26/342; F01D 5/082; F01D 5/147; F01D 5/148; F01D 5/18; F01D 5/34
See application file for complete search history.

(56) References Cited

U.S. PATENT DOCUMENTS

| | | | |
|---|---|---|---|
| 7,431,564 | B2 | 10/2008 | Newman |
| 8,029,865 | B2 | 10/2011 | Mielke |
| 9,464,527 | B2* | 10/2016 | Thompson, Jr. ........ F01D 5/185 |
| 2005/0232780 | A1 | 10/2005 | Newman |
| 2011/0052412 | A1* | 3/2011 | Ader ................... B22F 3/1055 416/97 R |

* cited by examiner

INTERNALLY COOLED TURBINE BLISK AND METHOD OF MANUFACTURE

BACKGROUND

The present disclosure relates to a part, for example a turbine component such as a bladed disk (BLISK), compressor blade, or turbine blade, manufactured using additive manufacturing processes.

An aircraft gas turbine engine or jet engine draws in and compresses air with an axial-flow compressor, mixes the compressed air with fuel, burns the mixture, and expels the combustion gases through an axial-flow turbine to power a compressor. The compressor and turbine, each include a disk with blades projecting from its periphery. The disk turns rapidly on a shaft.

There are two approaches to the assembly of the blades and disk of an axial-flow compressor or axial-flow turbine. In one approach, the component is made by forging the disk as a single piece with slots at the periphery. A plurality of blades are mechanically affixed to the disk, using a dovetail attachment or other structure. Typically, the blades are individually cast or forged to shape with a root section termed a "dovetail" or "fir tree" that fits into slots formed in the disk. Slots that resemble an inverted 'v' are cut into the rim of a disk; one for every blade. The blades have corresponding features that interlock with the slots in the disk. Assembly is completed by sliding the sections of the blades into the slots in the disk. When the disk spins at high speeds the centrifugal load of the blade is transferred to the disk through these 'dovetail' or 'fir tree' arrangements. Due to the complex shape of the contact areas between the blades and disk, the contact stress limit requires additional area (axial engagement) for a robust design. If a blade does not fit properly, fails, or is damaged during service, it may be readily replaced by reversing the assembly procedure to remove the blade, and providing a new blade.

In the other approach, the blades are integral with the disk. The second approach having an integral blade/disk structure, called a "blisk" in the art, is favored in those situations where it may be used because the mechanical attachment of the first approach may add a substantial amount of weight to the structure. More specifically, the blisk approach to manufacturing offers the potential for increased performance through reduced weight. Such an article can be cast or forged as a large disk with an excess of metal at the periphery. The blades may then be machined from the excess metal, thus integrally attached to the disk. The final product is expensive to produce, as it requires extensive high-precision machining operations. An error in machining even one of the blades may result in rejection and scrapping of the entire BLISK or an expensive and time consuming repair.

Turbine blisks with uncooled blades have been fielded on commercial products. However, without cooling they are limited to very low temperature operation. Current turbine weight reduction efforts have focused on the use of advanced materials such as CMC's or TiAl's in conventional blade and disk designs. While ceramic matrix materials (CMC's) enable rotating component weight reductions, CMC technology still faces the challenges of manufacturability, interface with a metal components, life and cost.

There is thus a desire for an improved bladed disk, or blisk design, and method of manufacture and/or repair, wherein the article includes internal cooling features. The present disclosure fulfills this need, and further provides related advantages.

These and other shortcomings of the prior art are addressed by the present disclosure, which provides a power generation system.

BRIEF DESCRIPTION

In accordance with an embodiment shown or described herein, provided is method of manufacturing an internally cooled blisk. The method including defining a configuration for the internally cooled blisk, programming the configuration into an additive manufacturing system, depositing a powder into a chamber, applying an energy source to the deposited powder and consolidating the powder into a cross-sectional shape corresponding to the defined configuration. The step of defining the configuration for the internally cooled blisk including defining the configuration comprising a disk, an annular array of angularly spaced blades extending about a periphery of the disk and one or more internal cooling features defined within the internally cooled blisk.

In accordance with another embodiment shown or described herein, provided is method of manufacturing an internally cooled blisk. The method including defining a configuration for the internally cooled blisk, programming the configuration into an additive manufacturing system, depositing a powder into a chamber, applying an energy source to the deposited powder and consolidating the powder into a cross-sectional shape corresponding to the defined configuration. The step of defining the configuration for the internally cooled blisk including defining the configuration comprising a disk, an annular array of angularly spaced blades extending about a periphery of the disk and one or more cooling fluid flow passages in fluid communication with an input of a cooling fluid flow. The one or more cooling fluid flow passages comprising one or more passages defining one or more cooling plates, one or more passages defining one or more discrete branch structures in a web transition area where the disc meets each of the plurality of blades, one or more cooling channels within the annular array of angularly spaced blades and one or more passages defined on a downstream side of the disk.

In accordance with yet another embodiment shown or described herein, provided is an internally cooled blisk. The internally cooled blisk including a disk having a peripheral rim, an annular array of blades spaced apart round the periphery of the disk, and one or more cooling fluid flow passages in fluid communication with an input of a cooling fluid flow. Each of said blades comprising an airfoil extending outwardly from the periphery of the disk in a generally radial direction. The one or more cooling fluid flow passages comprising one or more passages defining one or more cooling plates, one or more passages defining one or more discrete branch structures in a web transition area where the disc meets each of the plurality of blades, one or more cooling channels within the annular array of angularly spaced blades and one or more passages defined on a downstream side of the disk. The disk and the annular array of blades are integrally formed as a single component.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present disclosure are also contemplated, as noted in the discussion. In all cases, this disclosure presents illustrated embodiments of the present disclosure by way of representation and not limitation. Numerous other modifications and embodiments can be devised by those skilled in the art which fall within the scope and spirit of the principles of this disclosure.

DETAILED DESCRIPTION

The present disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The terms "comprising," "including," and "having" are intended to be inclusive, and mean that there may be additional elements other than the listed elements. Furthermore, the terms "first," "second," and the like, herein do not denote any order, quantity, or importance, but rather are used to distinguish one element from another.

Embodiments of the invention described herein address the noted shortcomings of the state of the art. In accordance with this disclosure, an improved internally cooled turbine blisk and method of manufacture is described.

Figure 1:
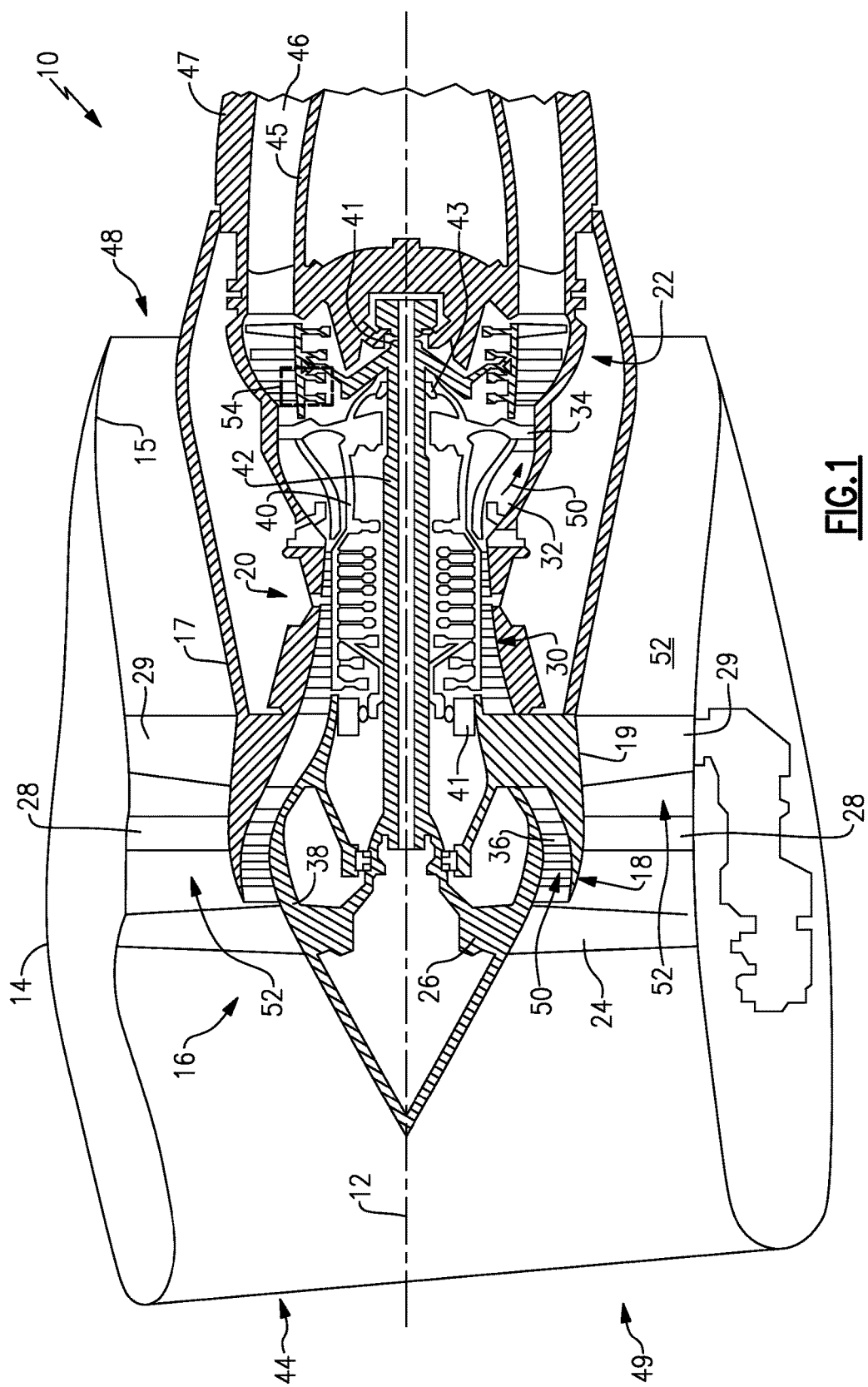
FIG. 1 is a schematic longitudinal cross-section of portion of an aircraft engine including an internally cooled blisk, in accordance with one or more embodiments shown or described herein.

Referring to the drawings wherein identical reference numerals denote the same elements throughout the various views, FIG. 1 depicts a schematic illustration of an exemplary aircraft engine assembly 10. The engine assembly 10 has a longitudinal center line or axis 12 and an outer stationary annular fan casing 14 disposed concentrically about and coaxially along the axis 12. In the exemplary embodiment, the engine assembly 10 includes a fan assembly 16, a booster compressor 18, a core gas turbine engine 20, and a low-pressure turbine 22 that may be coupled to the fan assembly 16 and the booster compressor 18. The fan assembly 16 includes a plurality of rotor fan blades 24 that extend substantially radially outward from a fan rotor disk 26, as well as a plurality of structural strut members 28 and outlet guide vanes ("OGVs") 29 that may be positioned downstream of the rotor fan blades 24. In this example, separate members are provided for the aerodynamic and structural functions. In other configurations, each of the OGVs 29 may be both an aerodynamic element and a structural support for an annular fan casing (described presently).

The core gas turbine engine 20 includes a high-pressure compressor 30, a combustor 32, and a high-pressure turbine 34. The booster compressor 18 includes a plurality of rotor blades 36 that extend substantially radially outward from a compressor rotor disk 38 coupled to a first drive shaft 40. The high-pressure compressor 30 and the high-pressure turbine 34 are coupled together by a second drive shaft 42. The first and second drive shafts 40 and 42 are rotatably mounted in bearings 41 which are themselves mounted in a turbine frame 45 and a turbine rear frame 47. Further, a differential bearing 43 is positioned between the first drive shaft 40 and the second drive shaft 42. The engine assembly 10 also includes an intake side 44, defining a fan intake 49, a core engine exhaust side 46, and a fan exhaust side 48.

During operation, the fan assembly 16 compresses air entering the engine assembly 10 through the intake side 44. The fluid flow exiting the fan assembly 16 is split such that a portion 50 of the fluid flow is channeled into the booster compressor 18, as compressed fluid flow, and a remaining portion 52 of the fluid flow bypasses the booster compressor 18 and the core gas turbine engine 20 and exits the engine assembly 10 via a bypass duct 52, through the fan exhaust side 48 as bypass air. More specifically, the bypass duct 52 extends between an interior wall 15 of the fan casing 14 and an outer wall 17 of a booster casing (or fan front frame) 19. This portion 52 of the fluid flow, also referred to herein as the bypass fluid flow 52, flows past and interacts with the structural strut members 28 and the outlet guide vanes 29. The plurality of rotor blades 24 compress and deliver the compressed fluid flow 50 towards the core gas turbine engine 20. Furthermore, the fluid flow 50 is further compressed by the high-pressure compressor 30 and is delivered to the combustor 32. Moreover, the compressed fluid flow 50 from the combustor 32 drives the rotating high-pressure turbine 34 and the low-pressure turbine 22 and exits the engine assembly 10 through the core engine exhaust side 46.

As previously noted, in certain presently available commercial engines, the compressor and/or the turbine are made by forging the blades and disk as a single piece, referred to as a blisk. Such an article can be cast or forged as a large disk that is machined to form the blades extending therefrom. This type of blisk manufacture, while offering the potential for increased performance through reduced weight and number of overall parts, is expensive to produce in light of the required expensive high-precision machining operations. In accordance with exemplary aspects of the present component and method of manufacture, a novel internally cooled blisk 54 and method of manufacture is presented for use the aircraft engine assembly 10. More particularly, the exemplary internally cooled blisk 54 is manufactured using additive manufacturing processes and configured as a single, integrally formed component, including one or more internal cooling passages. The concept disclosed herein is applicable to any blisk-type component for use in a compressor or turbine of an aircraft. Accordingly, in an embodiment, the internally cooled blisk 54 is an internally cooled turbine blisk. In another embodiment, the internally cooled blisk 54 is an internally cooled compressor blisk.

Figure 2:
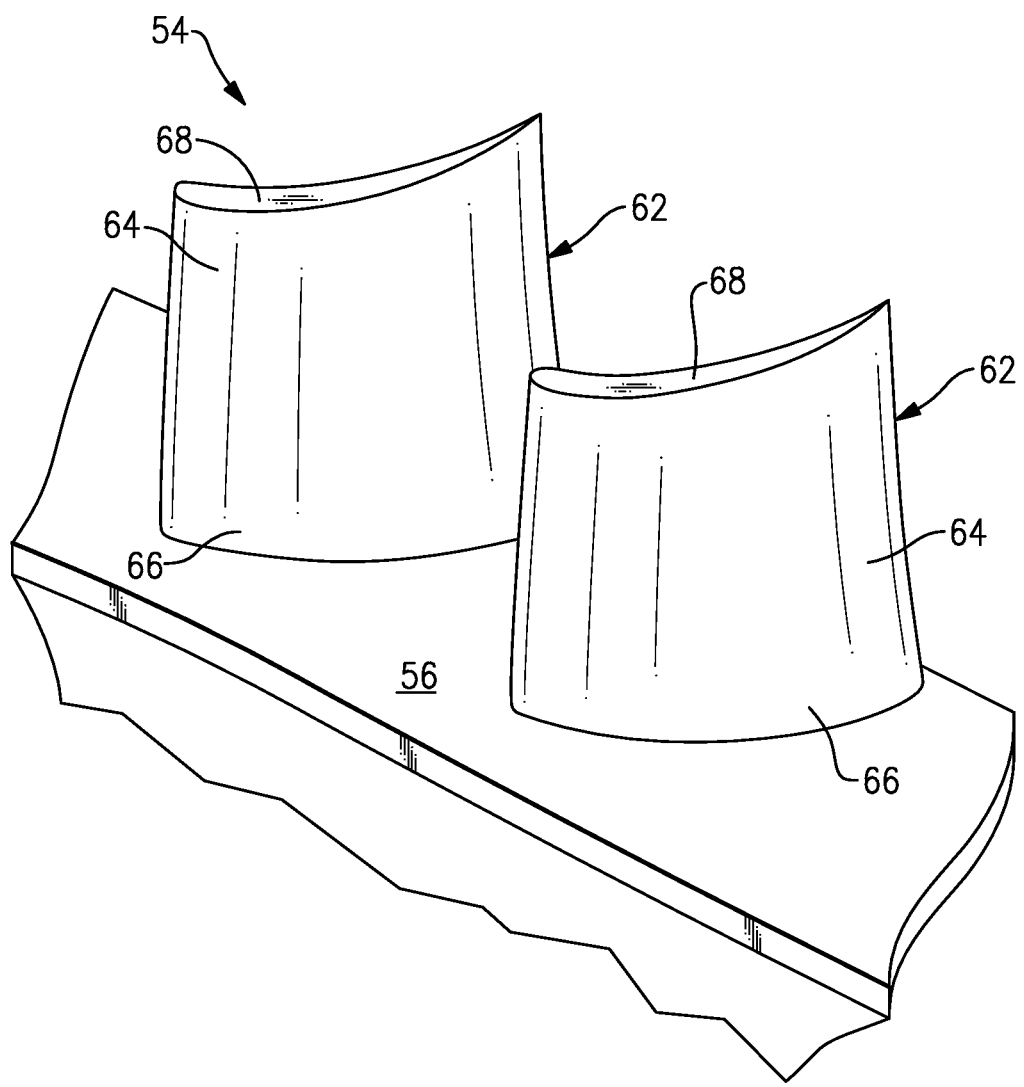
FIG. 2 is a fragmentary elevation view of a portion of the internally cooled blisk of FIG. 1, in accordance with one or more embodiments shown or described herein.

FIG. 2 depicts in a fragmented elevation view, a portion of the exemplary internally cooled blisk 54, as indicated by the dotted line of FIG. 1, manufactured using additive manufacturing, in accordance with one or more embodiments shown or described herein. The internally cooled blisk 54 includes a blisk disk 56 and a plurality of blades 62, of which two are depicted, integrally attached thereto. That is, the attachment of the blisk disk 56 and the plurality of blades 62 is metallurgical and semi-permanent or permanent in nature. The blisk disk 56 is a flat disk that is mounted to rotate on the shaft 40 (FIG. 1) extending through its center. The blisk disk 56 is preferably made of a nickel-base superalloy. Each of the plurality of the blades 62 extends outwardly from the center of the blisk disk 56 along respective radii of the blisk disk 56.

Each of the plurality of blades 62 comprises an airfoil 64 that is curved to function in the stream of gas that flows past the blade 62. Each airfoil 64 has a root end 66 at a base of the blade 62 and a tip end 68 remote from the root end 66. The internally cooled blisk 54 may be a turbine blisk used in one of the hot stages of a gas turbine engine, or it may be a compressor blisk used in one of the rear-end compressor stages. The details of the shapes and dimensions of the disk 56 and the plurality of blades 62 are known in the art and are not within the scope of the present disclosure.

As previously indicated, the internally cooled blisk 54 is manufactured using additive manufacturing processes. Additive manufacturing is a known technology that enables the "3D-printing" of components of various materials including metals and plastics. In additive manufacturing, a part is built in a layer-by-layer manner by leveling metal powder and selectively fusing the powder using a high-power energy source, such as a laser or electron beam. After each layer, more powder is added and with the application of energy from the energy source, the next layer is formed, simultaneously fusing it to the prior layers to fabricate a complete component buried in a powder bed. When removed from the powder bed, the component typically has a rough surface finish that must be improved via post-build processes such as grit blasting, grinding, sanding, or polishing to meet industry standards. Furthermore, the surfaces internal passages for fluid flow contacting components may require additional processing steps.

Figure 3:
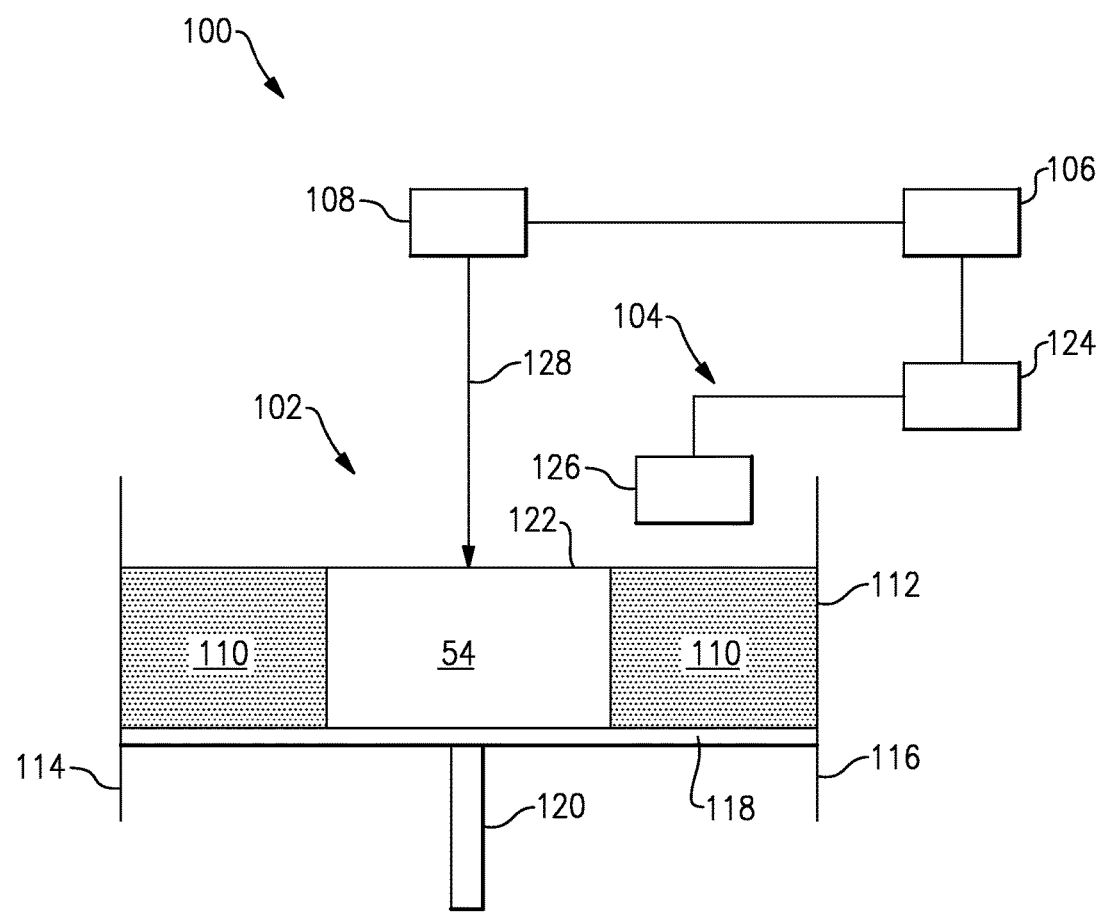
FIG. 3 is a schematic view of an exemplary additive manufacturing apparatus used to fabricate the internally cooled blisk of FIG. 1, in accordance with one or more embodiments shown or described herein.

Referring now to FIG. 3, illustrated is a schematic view of an exemplary additive manufacturing system 100 used to fabricate the internally cooled blisk 54 of FIGS. 1 and 2. In the exemplary embodiment, a model of the internally cooled blisk 54 is designed using computer aided design (CAD) software such that the model may include 3-dimensional coordinates of the complete formation of the internally cooled blisk 54 including the blisk disk 56 and the plurality of blades 62. Alternatively, the model may be defined in any suitable manner. The CAD model may also include a number of successive 2-dimensional cross-sectional slices that together form the 3-dimensional model. Generally, additive manufacturing provides faster material processing time, innovative joining techniques, and less concern for geometric constraints than known fabrication techniques. In one exemplary embodiment, direct metal laser melting (DMLM), also known as direct metal laser sintering (DMLS), is used to produce the additive-manufactured article, i.e., the internally cooled blisk 54. DMLM is a commercially available laser-based rapid prototyping and tooling process by which complex components may be directly produced by precision melting and solidification of metal powder into successive deposit layers of larger structures, each deposit layer corresponding to a cross-sectional deposit layer of the 3-dimensional component.

In the exemplary embodiment, system 100 is a DMLM system. Alternatively, system 100 may be any additive manufacturing system that facilitates fabricating the internally cooled blisk 54 as described herein. The additive manufacturing system 100 includes an additive manufacturing apparatus 102, a powder delivery system 104, a computer 106, and an energy source, such as a laser, 108 and functions to produce the internally cooled blisk 54 from a powder 110, such as a metal powder, a ceramic powder or a composite powder.

In the exemplary embodiment, apparatus 102 is a DMLM apparatus. Alternatively, apparatus 102 may be any additive manufacturing apparatus that facilitates fabricating the internally cooled blisk 54 as described herein. The additive manufacturing apparatus 102 includes a powder bed 112 having a first side wall 114 and an opposing second side wall 116. The additive manufacturing apparatus 102 further comprises a build plate 118 that extends at least partially between first and second side walls 114 and 116 and that facilitates supporting the internally cooled blisk 54 during fabrication. A piston 120 is coupled to build plate 118 and is movable within the powder bed 112 in a vertical direction along first and second side walls 114 and 116. The piston 120 is adjusted such that a top surface of build plate 118 defines a working surface 122. The powder delivery device 104 includes a powder supply 124 coupled to a powder applicator 126 that transfers the powder 110 from the delivery device 104 to the apparatus 102. In the exemplary embodiment, the powder applicator 126 is a wiper configured to distribute an even layer of the powder 110 into the powder bed 112. Alternatively, the powder applicator 126 may be a spray nozzle that transfers the powder 110 from the powder supply 124 to the powder bed 112. Generally, the powder applicator 126 may be any device that transfers the powder 110 from the powder supply 124 to the powder bed 112 such that the system 100 operates as described herein.

During operation, the powder applicator 126 distributes an even layer of the powder 110 from the powder supply 124 onto the working surface 122 of the build plate 118. The laser 108 directs a laser beam 128, which is guided by the computer 106, onto the working surface 122 of the build plate 118 to selectively fuse the powder 110 into a cross-sectional layer of the internally cooled blisk 54. More specifically, the laser beam 128 selectively fuses the powder 110 to form the internally cooled blisk 54 by rapidly melting the powder 110 particles together to form a solid. As the laser beam 128 continues to form a portion of each layer, heat is conducted away from the previously melted area, thereby leading to rapid cooling and solidification. In the exemplary embodiment, the computer 106 controls the laser beam 128 such that each layer of the powder 110 will include unsintered powder and sintered powder that forms at least a portion of the cross-sectional layer of the internally cooled blisk 54.

In the exemplary embodiment, upon completion of a respective layer of the internally cooled blisk 54, the build plate 118 is lowered by the piston 120 and the powder applicator 126 distributes an additional layer of the powder 110 into the powder bed 112 of additive the manufacturing apparatus 102. The laser beam 128 is again controlled by the computer 106 to selectively form another cross-sectional layer of the internally cooled blisk 54. This process is continued as successive cross-sectional layers are built into the internally cooled blisk 54. Each successive deposit layer of the internally cooled blisk 54 may be, for example, between 10 micrometers (μm) and 200 μm, although the thickness may be selected based on any number of parameters.

Figure 4:
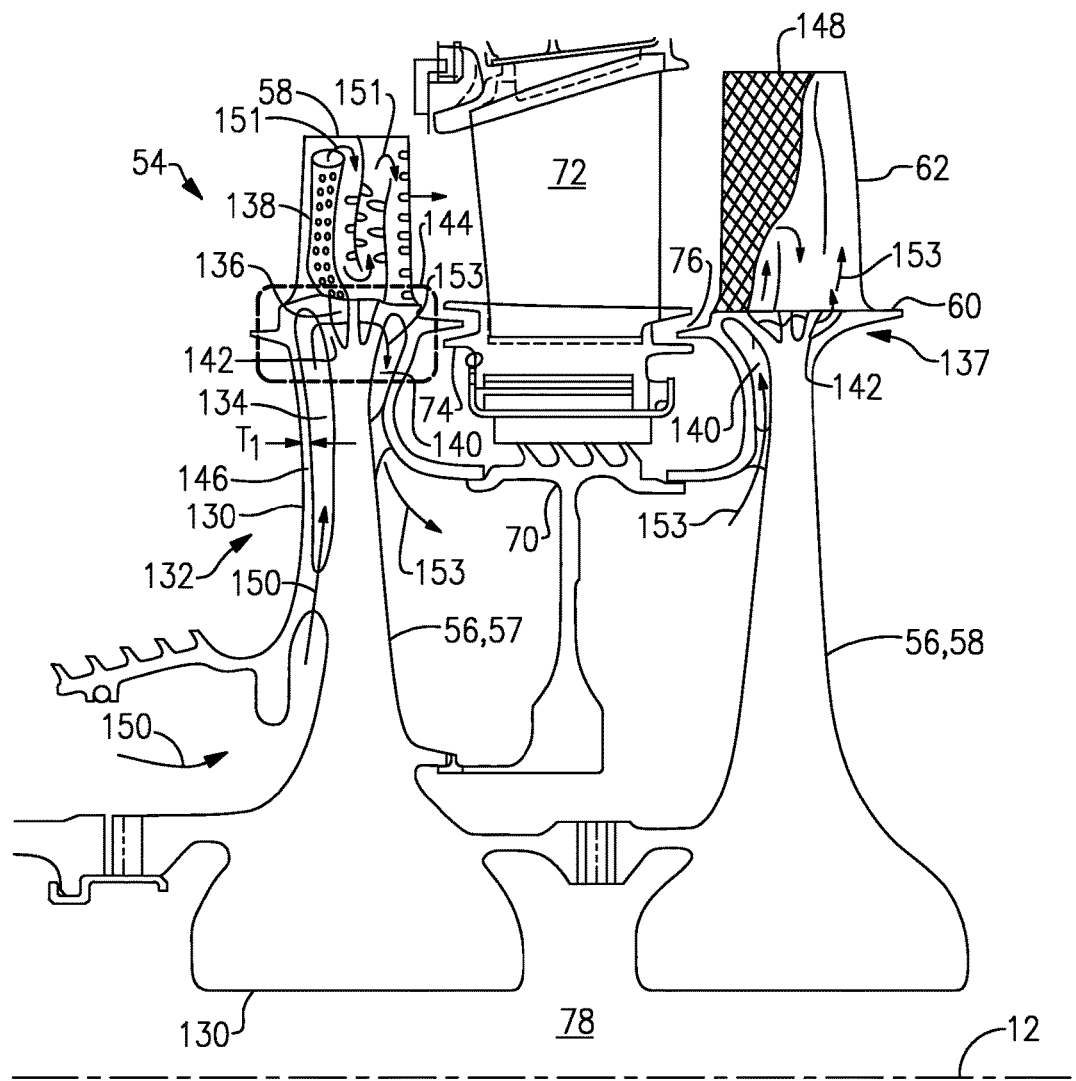
FIG. 4 is a fragmentary cross-sectional view of a portion of the internally cooled blisk of FIG. 1, in accordance with one or more embodiments shown or described herein.

Accordingly, the internally cooled blisk 54 is fabricated beginning at a bore surface 130 (as illustrated in FIG. 4) such that a respective cross-sectional layer of the internally cooled blisk 54 may include at least a portion of the blisk disk 56 having one or more cooling fluid flow passages 132 (as illustrated in FIG. 4) formed therein. For purpose of this disclosure and as best illustrated in FIG. 4, the cooling fluid flow passages 132 as described herein may include one or more passages 134 defined by the disk 56 and a cooling plate (described presently) incorporated in the manufacturing process, one or more passages 136 defined in a web transition area 137 where the disc 56 meets each of the plurality of blades 62, one or more cooling channels 138 within the blades 62, one or more passages 140 defined on a downstream side of an upstream disk 57 and/or on an upstream side of a downstream disk 58, and/or effusion cooled blade surfaces 148 (as illustrated in FIG. 4), in fluid communication so as to provide for the flow therethrough of a cooling fluid flow 150. More specifically, the additive manufacturing apparatus 102 facilitates simultaneously forming the blisk disk 56 and the plurality of blades 62, including the cooling fluid flow passages 132 therein. When the additive manufacturing process is completed, any unsintered powder 110 is removed from the hub surface 130 and from internally cooled blisk 54 is removed from the powder bed 112 in anticipation of further processing.

In the exemplary embodiment, the internally cooled blisk 54 may be formed from the powder 110 comprising a superalloy for example, a cobalt-based superalloy, such as cobalt-chrome, or a nickel-based superalloy, as well as high temperature stainless steels, titanium, chromium, or other alloys, or a combination thereof. Cobalt and nickel-based superalloys are most often used to fabricate turbine engine components because of the high strength required for long periods of service at the high temperatures characteristic of operation. The powder 110 may be selected for enhanced strength, durability, and useful life, particularly at high temperatures.

After fabrication, further processing of the internally cooled blisk 54 may be required. Such post-fabrication processing may include, for example, heat treatments, peening, polishing, hot isostatic pressing (HIP), or ECM. In some embodiments, one or more of the post-fabrication processing steps listed above are not necessary and may be omitted. In the exemplary embodiment, as a result of the additive manufacturing process, the internally cooled blisk 54 may include substantial surface roughness and may not be suitable for use without further processing to facilitate smoothing of the surfaces.

Referring now to FIG. 4, illustrated is a schematic longitudinal cross-section of a portion (as indicated by dotted line in FIG. 1) of the high-pressure turbine 34 of the aircraft engine of FIG. 1, illustrating the internally cooled blisk 54 formed according to the additive manufacturing process previously described. In the illustrated embodiment of FIG. 4, the internally cooled blisk 54 is an internally cooled turbine blisk. As illustrated, the high-pressure turbine 34 is comprised of successive stages of turbine disks 56, including the upstream disk 57 and the downstream disk 58, each having at their periphery an annular array or row of angularly spaced blades 62. The disk stages are joined together adjacent their peripheries by intervening annular spacers 70 which define the inner bounds of the annular flowpath 50 (FIG. 1) through the high-pressure turbine 34 for an airstream. An annular row of stator vanes 72, of which only a single stator vane is shown, are mounted by the turbine frame 45 and project radially inwardly into the flowpath between each consecutive stage of blades 62 and terminate proximate an annular labyrinth seal 74. A gap 76 is defined between adjacent stationary and rotating components to accommodate axial thermal growth of the rotating components and the stationary components, thereby preventing the components from running into one another.

As previously indicated, through the use of additive manufacturing, the internally cooled blisk 54 architecture allows for considerable weight reduction as the dovetail structure, sealing rings and associated fastening hardware, typical of known blisk designs, may be eliminated. Furthermore, design of each of the plurality of blades 62 may be further optimized using the freedoms afforded with additive manufacturing. More particularly, additive manufacturing provides for a decrease in wall thickness, $T_1$, beyond the current limits of investment casting.

As illustrated in FIG. 4, the overall structure of the internally cooled blisk 54, and more particularly the web transition area 137 where the disc 56 meets each of the plurality of blades 62, is not axisymmetric but formed with discrete branches 142. As indicated by dashed line, additive manufacturing may provide an organic-like 'root-ball' structure 144 in this web transition area 137, having defined as a portion thereof the plurality of branches 142, and located at a point where each of the plurality of blades 62 is integrated with a rim 60 of the disk 56. This type of improved web transition 137 at a point where each of the plurality of blades 62 meets the disk 56 would allow for a reduction in mass and stress in the internally cooled blisk 54, while allowing for the inclusion of the complex cooling circuits, generally indicated by the cooling fluid flow passages 132 and the path of the cooling fluid flow 150. More specifically, utilizing additive manufacturing to form each of the plurality of blades 62 integral with the disk 56, eliminates the need for the use of known "dovetail" or "fir tree" arrangements, previously described. In the illustrated embodiment, the load from the plurality of blades 62 is directly transferred to the disk 56, resulting in a substantial (up to approximately 10%) weight savings in the disk 56 and an even higher moment of rotational inertia.

As illustrated, the root-ball structure 144 and more specifically the plurality of branches 142, provide for the distribution of the load and reduce stress concentrations while allowing cooling fluid flow 150 to flow in two directions: i) radially outward into each of the plurality of blades 62; and ii) axially to subsequent stages. More particularly, during operation, the cooling fluid flow 150 flows into the one or more passages 134 defined by the disk 56 and a cooling plate 146, formed during manufacture. Subsequently, a first portion 151 of the cooling fluid flow 150 is allowed to enter the plurality of blades 62 through the cooling channels 138 within each of the blades 62. A second portion 153 of the cooling fluid flow 150 passes through the rim 60 of the disk 56 into a downstream side of the disk 56 and through a passage 140 defined during the manufacturing process. The second portion 153 of the cooling fluid flow 150 is used to further cool the rim 60 of the upstream disk 57, the rim 60 of the downstream disk 58 and the blades 62 of the downstream disk 58.

As previously indicated, the internally cooled blisk 54 includes the one or more passages 134 that define the one or more cooling plates 146, the one or more passages 136 that define the branches 142, and the one or more passages 140. The one or more cooling plates 146 further facilitate the flow of the cooling fluid flow 150 from forward the inner radius of the internally cooled blisk 54, radially outward to each of the plurality of blades 62, and axially to subsequent stages. In addition, the geometry of the blade cooling circuit, such as defined by passages 134, 136, 140, the cooling channels 138 and the one or more cooling plates 146 may be further optimized to both improve heat transfer and strategically place vibrational modes. Additive manufacturing may further provide for the inclusion of effusion cooled blade surfaces 148 on the one or more of the plurality of blades 62. The effusion cooled blade surfaces 148 may be built during additive manufacturing into one or more of the plurality of blades 62 either in localized areas or over an entire blade outer surface.

In accordance with the present disclosure, additive manufacturing methods may be utilized to construct the internally cooled blisk 54 including the aggressive three-dimensional cooling circuit defined by cooling fluid flow passages 132 and/or the effusion cooled blade surfaces 148 to promote cooling of the internally cooled blisk 54. The passages 134, 136, 140, the cooling channels 138 and the cooling plates 146 may be arranged within the internally cooled blisk 54 in any of a variety of ways so as to receive at least a portion of the cooling fluid flow 150 and/or cooling air so as to efficiently cool the internally cooled blisk 54. As an example, the passages 136 that define the branches 142 within the root-ball structure 144 of each disk 56 may be configured evenly or substantially evenly throughout the plurality of stages of the internally cooled blisk 54. However, in some embodiments, the passages 136 that define the branches 142 may vary from disk 56 to disk 56 to accommodate for portions of the internally cooled blisk 54 that may experience relatively high temperatures.

An internally cooled blisk 54 produced in accordance with the additive manufacturing methods of the present disclosure may incorporate various cooling features having curved or asymmetrically shaped geometries. FIG. 4 illustrates a cross-section of one embodiment of the internally cooled blisk 54 including the passages 134, 136, 140, the cooling channels 138, the cooling plates 146 and the effusion cooled blade surfaces 148 that may be formed via an additive manufacturing process, but any geometry may be suitable for the various cooling features. Furthermore, the cooling features produced using additive manufacturing techniques may, in some embodiments, have different configurations within the same internally cooled blisk 54. Various other geometries are contemplated, including any configurations that provide increased surface area within the various cooling features so as to increase heat transfer between the cooling fluid flow 150 and the internally cooled blisk 54 as the fluid flows through the cooling fluid flow passages 132.

Additive manufacturing techniques may also allow for construction of relatively thin walls within portions of the internally cooled blisk 54, which may allow for increased cooling. In general, thinner walls within portions of the internally cooled blisk may allow for each cooling feature, and as an example, the cooling channels 138, to have a longer length and/or a higher ratio of length to diameter (L/D), allowing for more heat to be transferred due to the increased surface area within the cooling channel 138. Thus, in some embodiments, additive manufacturing techniques may be used to construct relatively thin-walls within the internally cooled blisks having cooling channels 138 with high L/D values and increased surface area for heat transfer. The increased surface area, along with mixing, improves the heat transfer, and thus cooling of the internally cooled blisk 54.

Furthermore, the cooling channels 138 produced using additive manufacturing techniques may, in some embodiments, have different configurations within the same internally cooled blisk 54. For example, one or more cooling channels 138, may be incorporated into the internally cooled blisk 54 and connect within the interior of the internally cooled blisk 54. In another example, two cooling channels 138 may intersect, enabling air to flow between the connected cooling channels 138. In certain embodiments, one or more of the cooling channels 138 may also be configured to branch or split within the blade 62 of the internally cooled blisk 54.

As previously indicated, the internally cooled blisk 54 described herein may be manufactured from any of a variety of materials. In some embodiments, the internally cooled blisk 54 may be manufactured from a corrosion resistant metal alloy, such as a nickel-based alloy, a chrome-based alloy or a cobalt-based superalloy. More specifically, in some embodiments, the internally cooled blisk 54 may be manufactured from INCONEL 617 or INCONEL 718 (nickel-based alloys, manufactured by Special Metals Corporation), cobalt chrome, or other similar alloys. Additionally, any other materials capable of being constructed and shaped by an additive manufacturing process may be utilized. For example, high temperature stainless steels, titanium, chromium, or other alloys, or a combination thereof may be utilized in construction of the internally cooled blisk 54, as these materials are available as a powder (e.g., either commercially or post-processing) and can be processed into particular structures via additive manufacturing techniques. By way of additional examples, various ceramics and composites may be utilized in construction of the internally cooled blisk 54. Various combinations of materials are also contemplated in the structure of the internally cooled blisk 54.

In an embodiment, the complete internally cooled blisk 54 is comprised of one equiax material by additive manufacturing. In an alternate embodiment, the internally cooled blisk 54 may comprise a functionally graded composition that provides high tensile strength capability proximate a bore 78 of the internally cooled blisk 54 and high temperature resistance capability in the plurality of blades 62 and the disk 56. In an embodiment, the additive manufacturing process may enable advanced cooling concepts that preclude the need for single crystal or directionally solidified blisk materials by reducing the surface temperatures of the plurality of blades 62.

Utilizing additive manufacturing processes to fabricate of the internally cooled blisk 54 may further provide for the fabrication of additional features, such as, but not limited to, closed-loop vapor cooling cycles, heat exchangers, service passageways and control elements. These additional features provide improved cooled-cooling-air schemes that may be made more effective or more attractive with the additively manufacturing process.

Figure 5:
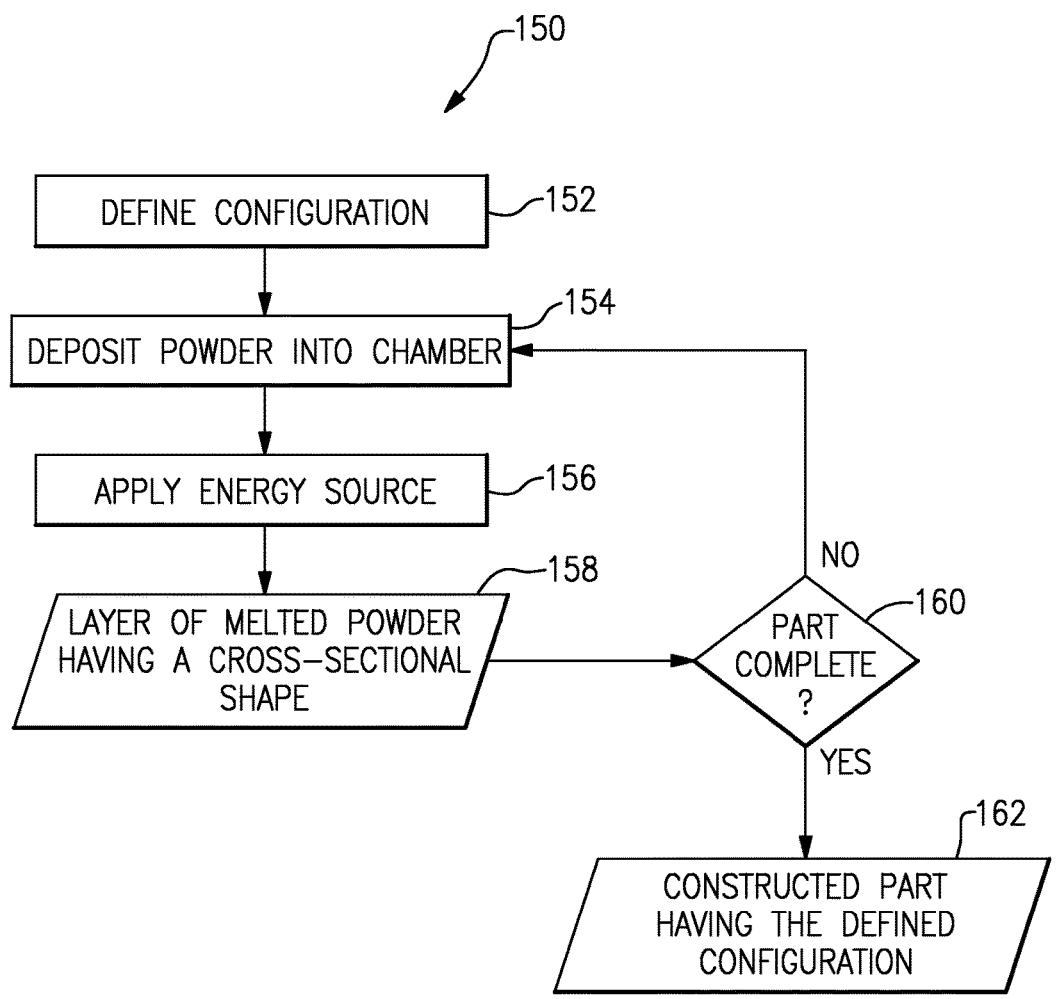
FIG. 5 is a flowchart depicting an embodiment of an additive manufacturing method for producing the internally cooled blisk of FIG. 1, in accordance with one or more embodiments shown or described herein.

FIG. 5 is a block diagram illustrating an embodiment of a method 150 for constructing an internally cooled blisk (e.g., internally cooled blisk 54) using additive manufacturing techniques. The method 150 may be performed by an additive manufacturing system, with the acts described herein being performed by a computer, such as previously described with regard to FIG. 3. The method 150 includes defining a particular configuration, in a step 152. The configuration may be programmed into an additive manufacturing system by using a specialized or general purpose computer, for example. In an embodiment, the model is for an internally cooled blisk (e.g., internally cooled blisk 54) having a plurality of internal cooling features (e.g., the passages 134, 136, 140, the cooling channels 138, the cooling plates 146, and/or the effusion cooled blade surfaces 148) defining one or more cooling fluid flow passages 132, wherein the internally cooled blisk 54 has a complex shape. The defined configuration may have any shape and feature. For example, the shape may be curved, circular, spiral, radially expanded, radially contracted, or the like. In a step 154, a powder (e.g., a metal, ceramic, or composite powder) is deposited into a chamber, such as a vacuum chamber. Any of a variety of materials may be used in any suitable combination, including those described in detail above with respect to FIG. 4. In a step 156, an energy source (e.g., a laser 108 or electron beam) is applied to the deposited metal powder. The laser or electron beam melts or otherwise consolidates the powder into a layer having a cross-sectional shape 162 corresponding to the configuration defined in step 152. A computer or operator may determine whether the part is incomplete or complete, in step 160. If the part is incomplete, then steps 154 and 156 are repeated to produce layers of consolidated powder having cross-sectional shapes 162 corresponding to the defined confirmation or model until construction of the part is complete. In other words, the energy source is applied to melt or otherwise consolidate each newly deposited powder layer until the final product is complete and an internally cooled blisk having the defined configuration is produced, at step 162.

As noted above, additive manufacturing techniques generally allow for construction of custom parts having complex geometries, curvatures, and features, such as the cooling features of the internally cooled blisk 54 discussed herein. Accordingly, additive manufacturing may be used to construct internally cooled blisks having a variety of shapes and features, such as the passages 134, 136, 140, the cooling channels 138, the cooling plates 146 and/or the effusion blade surfaces 148, which are impractical or cannot be made using conventional techniques, such as laser or water jet machining techniques.

Additive manufacturing may be particularly useful in the construction of an internally cooled blisk 54 for a gas turbine system, as the internally cooled blisk 54 may be constructed from high-strength materials that may be difficult to machine or tool using traditional methods. In addition, additive manufacturing techniques provide the capability to construct complex solid objects from computer models, without difficult machining steps. In general, additive manufacturing techniques involve applying a source of heat, such as a laser or electron beam, to deposited powder layers (e.g., layer after layer) in order to consolidate the powder and 'grow' a part having a particular shape.

As previously indicated, the use of additive manufacturing to fabricate the internally cooled blisk 54 provides many advantages, including weight reduction and power-to-weight ratio improvement, leading to improved efficiency, decrease in fuel burn and lifecycle costs. With lighter rotating components, engine transient response will be improved, leading to increased aircraft maneuverability. In addition, as smaller engines are desirable for airframe integration, additive manufacturing provides for a reduction in engine size and lower parts count. A reduction in parts count may provide improved maintenance repair and operations (MRO) logistics, inventory management and supply chain operations. Reduction of rotating component weight multiplies to reductions in overall engine system weight and improves engine transient response. In addition, a lighter blade permits a lighter disk, requiring smaller bearings and lighter supports and lighter engine casings.

Although specific features of various embodiments of the disclosed internally cooled blisk may be shown in some drawings and not in others, this is for convenience only. In accordance with the principles of the disclosure, any feature of a drawing may be referenced and/or claimed in combination with any feature of any other drawing.

This written description uses examples to disclose the novel blisk, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of manufacturing an internally cooled blisk comprising:
    defining a configuration for the internally cooled blisk comprising a disk, an annular array of angularly spaced blades extending about a periphery of the disk and internal cooling features, wherein the internal cooling features include having a first portion of a cooling fluid flow providing cooling to the angularly spaced blades via a plurality of cooling channels defined in each of the angularly spaced blades and the first portion exiting an effusion blade surface defined on each of the angularly spaced blades and having a second portion of the cooling fluid flow bypassing the plurality of cooling channels to cool a downstream side of the disk via one or more passages defining a plurality of discrete branch structures between the disk and each of the angularly spaced blades;
    programming the configuration into an additive manufacturing system;
    depositing a powder into a chamber;
    applying an energy source to the deposited powder; and
    consolidating the powder into a cross-sectional shape corresponding to the defined configuration.

2. The method of claim 1, further including at least one of a plurality of passages defined in the disk and one or more cooling plates defined in the internally cooled blisk.

3. The method of claim 2, wherein the one or more passages defining a plurality of discrete branch structures includes a web transition.

4. The method of claim 1, wherein the powder comprises a metal powder.

5. The method of claim 4, wherein the powder comprises a nickel-based or cobalt-based superalloy.

6. The method of claim 1, wherein the powder comprises a ceramic powder.

7. The method of claim 1, wherein the powder comprises a composite powder.

8. The method of claim 1, further comprising repeating the depositing, applying, and consolidating steps to construct the internally cooled blisk having the defined configuration.

9. The method of claim 1, wherein the internally cooled blisk is not axisymmetric.

10. A method of manufacturing an internally cooled blisk comprising:
   defining a configuration for the internally cooled blisk, the configuration comprising
      a disk,
      an annular array of angularly spaced blades extending about a periphery of the disk and
      cooling fluid flow features in fluid communication with an input of a cooling fluid flow,
      wherein the cooling fluid flow features comprise
         one or more cooling plates,
         one or more discrete branch structures in a web transition area where the disk meets each of the angularly spaced blades,
         one or more cooling channels within angularly spaced blades,
         one or more passages defined on a downstream side of the disk and
         an effusion blade surface defined on one or more of the angularly spaced blades;
      having a first portion of the cooling fluid flow provide cooling to the one or more cooling channels and exiting the effusion blade surface, and
      having a second portion of the cooling fluid flow bypass the one or more cooling channels to the one or more passages via the one or more discrete branch structures in the web transition area;
   programming the configuration into an additive manufacturing system;
   depositing a powder into a chamber;
   applying an energy source to the deposited powder; and
   consolidating the powder into a cross-sectional shape corresponding to the defined configuration.

11. The method of claim 10, wherein the powder comprises at least one of a metal powder, a ceramic powder and a composite powder.

12. The method of claim 10, further comprising repeating the depositing, applying, and consolidating steps to construct the internally cooled blisk having the defined configuration.

13. An internally cooled blisk comprising:
   a disk having a peripheral rim;
   an annular array of blades spaced apart around the peripheral rim of the disk, each of said blades comprising an airfoil extending outwardly from the peripheral rim of the disk in a radial direction; and
   a cooling fluid flow in fluid communication with cooling features comprising
      one or more cooling plates,
      one or more discrete branch structures in a web transition area where the disk meets each of the blades,
      one or more cooling channels within the blades,
      one or more passages defined on a downstream side of the disk and an effusion blade surface defined on one or more of the blades;
   wherein the disk and the annular array of blades are integrally formed as a single component; and
   wherein the cooling fluid flow comprises having a first portion configured to flow from an input, to the one or more cooling channels within the blades and exiting the effusion blade surface and having a second portion of the cooling fluid flow bypassing the one or more cooling channels to the one or more passages via the one or more discrete branch structures in the web transition area.

14. The internally cooled blisk of claim 13, wherein the disk and the annular array of blades comprise a powder consolidated into an integral structure having defined therein the one or more cooling fluid flow passages by an additive manufacturing process.

15. The internally cooled blisk of claim 14, wherein the powder comprises at least one of a metal powder, a ceramic powder and a composite powder.

16. The internally cooled blisk of claim 15, wherein the metal powder comprises a nickel-based or cobalt-based superalloy.

17. The internally cooled blisk of claim 13, wherein the internally cooled blisk is not axisymmetric.

* * * * *